United States Patent
Sweeney et al.

(10) Patent No.: US 9,335,478 B2
(45) Date of Patent: May 10, 2016

(54) SUPPRESSION OF BACK REFLECTION IN A WAVEGUIDE

(71) Applicant: ASTRIUM LIMITED, Stevenage (GB)

(72) Inventors: Stephen Sweeney, Stevenage (GB); Yaping Zhang, Stevenage (GB)

(73) Assignee: ASTRIUM LIMITED, Hertfordshire (GB)

( * ) Notice: Subject to any disclaimer, the term of this patent is extended or adjusted under 35 U.S.C. 154(b) by 0 days.

(21) Appl. No.: 14/351,727

(22) PCT Filed: Oct. 9, 2012

(86) PCT No.: PCT/EP2012/069956
§ 371 (c)(1),
(2) Date: Apr. 14, 2014

(87) PCT Pub. No.: WO2013/053699
PCT Pub. Date: Apr. 18, 2013

(65) Prior Publication Data
US 2014/0233882 A1    Aug. 21, 2014

(30) Foreign Application Priority Data
Oct. 14, 2011  (EP) .................................. 11275128

(51) Int. Cl.
*G02F 1/01*  (2006.01)
*G02B 6/293*  (2006.01)
*G01J 3/02*  (2006.01)

(52) U.S. Cl.
CPC ............... *G02B 6/293* (2013.01); *G01J 3/0205* (2013.01); *G01J 3/0218* (2013.01); *G01J 3/0259* (2013.01); *G02B 6/29341* (2013.01)

(58) Field of Classification Search
CPC ........... G02B 6/29335; G02B 6/29343; G02B 6/29338; G02B 6/29341; G02B 6/29389; G02B 6/29391; G02B 6/293; G01J 3/0205; G01J 3/0218; G01J 3/0259
USPC .............. 385/1, 14–15, 27–28, 123, 129–132
See application file for complete search history.

(56) References Cited

U.S. PATENT DOCUMENTS 6,633,696 B1    10/2003  Vahala et al.
6,865,314 B1 *   3/2005  Blair et al. ...................... 385/27
(Continued)

FOREIGN PATENT DOCUMENTS

GB       2 470 115 A    11/2010
WO    WO 2007/014218 A2    2/2007

OTHER PUBLICATIONS

The development of a novel monolithic spectrometer chip concept, by Sweeney et al., Integrated Optics: Devices, Materials, and Technologies XVI, edited by Jean Emmanuel Broquin, Gualtiero Nunzi Conti, Proc. of SPIE vol. 8264, 82640O © 2012 SPIE CCC code: 0277-786X/12/$18 doi: 10.1117/12.907118.*

(Continued)

*Primary Examiner* — Ryan Lepisto
*Assistant Examiner* — Guy Anderson
(74) *Attorney, Agent, or Firm* — Buchanan Ingersoll & Rooney PC

(57) ABSTRACT

A structure for guiding electromagnetic radiation, including: a substrate; a waveguide provided on the substrate and having a first end for receiving electromagnetic radiation and a second end; and an anti-reflection region provided at the second end of the waveguide on the substrate, the length and the width of the anti-reflection region being optimized to suppress back reflection of radiation that reaches the second end.

20 Claims, 3 Drawing Sheets

(56) References Cited

U.S. PATENT DOCUMENTS

| | | | |
|---|---|---|---|
| 8,106,379 B2* | 1/2012 | Bowers | 257/14 |
| 8,731,345 B2* | 5/2014 | Hanjani | 385/14 |
| 9,002,147 B2* | 4/2015 | Akiyama | 385/3 |
| 2001/0004411 A1 | 6/2001 | Yariv | |
| 2002/0122615 A1* | 9/2002 | Painter et al. | 385/15 |
| 2005/0135721 A1 | 6/2005 | Painter et al. | |
| 2005/0135764 A1 | 6/2005 | Painter et al. | |
| 2005/0207699 A1 | 9/2005 | Painter et al. | |
| 2006/0039653 A1 | 2/2006 | Painter et al. | |
| 2009/0016399 A1* | 1/2009 | Bowers | 372/50.21 |
| 2009/0220228 A1 | 9/2009 | Popovic | |
| 2009/0323755 A1* | 12/2009 | Okayama | 372/94 |
| 2009/0324163 A1* | 12/2009 | Dougherty et al. | 385/14 |
| 2010/0141358 A1* | 6/2010 | Akyurtlu et al. | 333/219.1 |
| 2010/0284649 A1* | 11/2010 | Ishii | 385/31 |
| 2011/0273709 A1* | 11/2011 | Sweeney | 356/320 |
| 2012/0063484 A1* | 3/2012 | Goddard et al. | 372/94 |
| 2012/0081687 A1* | 4/2012 | Burrow et al. | 355/71 |
| 2013/0156368 A1* | 6/2013 | Hanjani | 385/14 |
| 2013/0209020 A1* | 8/2013 | Doerr et al. | 385/2 |
| 2013/0279849 A1* | 10/2013 | Santori et al. | 385/30 |
| 2015/0016767 A1* | 1/2015 | Akiyama | 385/3 |

OTHER PUBLICATIONS

High resolution on-chip spectroscopy based on miniaturized microdonut resonators by Xia et al., published Jun. 10, 2011 (C) 2011 OSA Jun. 20, 20111 vol. 19, No. 131 Optics Express 12356.*
International Search Report (PCT/ISA/210) mailed on Jan. 16, 2013, by the European Patent Office as the International Searching Authority for International Application No. PCT/EP2012/069956.
Written Opinion (PCT/ISA/237) mailed on Jan. 16, 2013, by the European Patent Office as the International Searching Authority for International Application No. PCT/EP2012/069956.
International Search Report (PCT/ISA/210) mailed on Mar. 13, 2013, by the European Patent Office as the International Searching Authority for International Application No. PCT/EP2012/069934.
Written Opinion (PCT/ISA/237) mailed on Mar. 13, 2013, by the European Patent Office as the International Searching Authority for International Application No. PCT/EP2012/069934.
International Search Report (PCT/ISA/210) mailed on Jan. 4, 2013, by the European Patent Office as the International Searching Authority for International Application No. PCT/EP2012/069928.
Written Opinion (PCT/ISA/237) mailed on Jan. 4, 2013, by the European Patent Office as the International Searching Authority for International Application No. PCT/EP2012/069928.
International Search Report (PCT/ISA/210) mailed on Jan. 7, 2013, by the European Patent Office as the International Searching Authority for International Application No. PCT/EP2012/069957.
Written Opinion (PCT/ISA/237) mailed on Jan. 7, 2013, by the European Patent Office as the International Searching Authority for International Application No. PCT/EP2012/069957.
International Search Report (PCT/ISA/210) mailed on Mar. 13, 2013, by the European Patent Office as the International Searching Authority for International Application No. PCT/EP2012/069935.
Written Opinion (PCT/ISA/237) mailed on Mar. 13, 2013, by the European Patent Office as the International Searching Authority for International Application No. PCT/EP2012/069935.

* cited by examiner

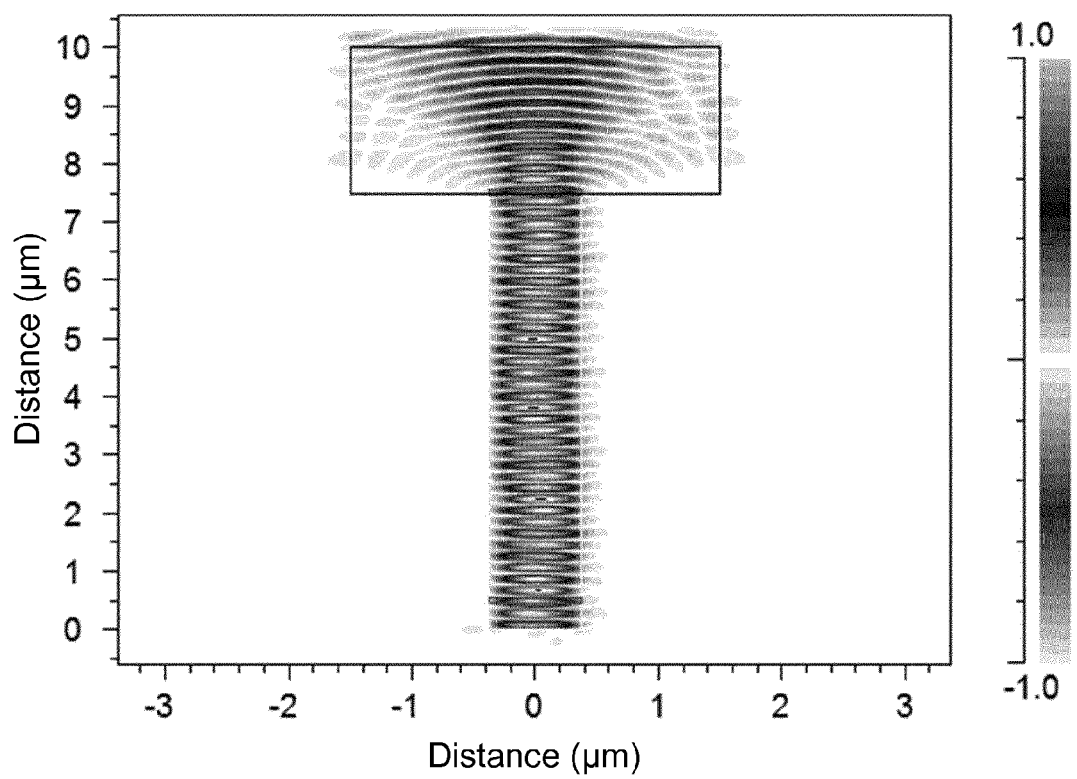
Fig. 5
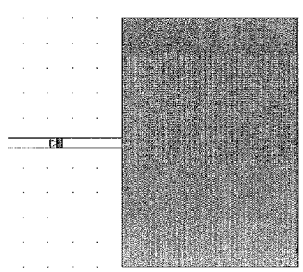
Fig. 6b
Fig. 6a
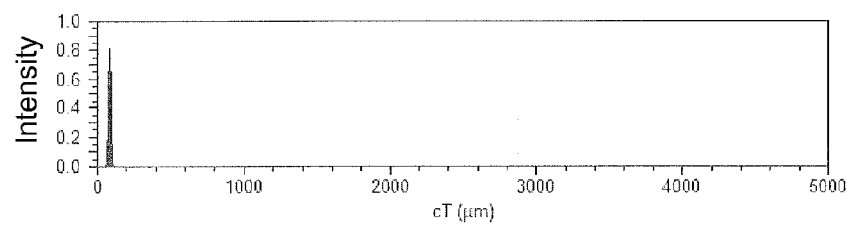

SUPPRESSION OF BACK REFLECTION IN A WAVEGUIDE

FIELD OF THE INVENTION

The invention relates to waveguides. More particularly, but not exclusively, the invention relates to the suppression of back reflections of radiation in a waveguide used in a spectrometer.

BACKGROUND OF THE INVENTION

Waveguides are used to guide electromagnetic radiation from one component of a device to another or to guide radiation within a component. One example of device which utilises a waveguide is a spectrometer.

Spectrometers are used in many applications for measuring properties of light across a range of wavelengths. For example, a spectrometer can be used for compositional analysis, by obtaining absorption or emission spectra for an object of interest. The presence and location of peaks within the spectra can indicate the presence of particular elements or compounds. Spectrometers are commonly used for analysis at optical wavelengths, but can also be used at other wavelengths such as microwave and radio wavelengths.

Spectrometers are typically relatively complex and expensive devices that require the alignment of a number of moving parts to be controlled with high precision. For example, a typical spectrometer may focus light onto a diffraction grating to split an incident beam into separate wavelengths, and the diffraction grating may be rotated to a specific angle to direct light of a particular wavelength towards a detector. In recent years chip-based spectrometers have been developed which can be highly miniaturised, have no moving parts, and can be manufactured using well-established lithography techniques. An example of such a spectrometer-on-a-chip is shown in FIG. 1.

The chip spectrometer 100 comprises a substrate 110, onto which are patterned a waveguide 120 and a plurality of disk resonators 130 coupled to the waveguide. Light enters the waveguide at a first end 120a and is guided towards a second end 120b. The resonators are arranged such that portions of the light in the waveguide are coupled into the disk resonators 130. Each resonator 130 is arranged to support a resonant mode at a particular wavelength such that only light of that wavelength is coupled into the resonator 130. On top of each disk resonator 130 is an electrode 140 for detecting current that is proportional to the amount of light present in that resonator. The current detected in each resonator therefore indicates the amount of light at that wavelength that was present in the input beam of light. Each electrode 140 is further connected to a signal bond pad 150 for connecting the spectrometer 100 to an external device for measuring the current. A portion of the light is not coupled into any of the resonators and reaches the second end 120b of the waveguide. Back-reflections from the end of the waveguide may give rise to interference within the spectrometer chip which degrades the performance of the spectrometer. A low reflective coating 160 is therefore evaporated or sputtered onto the second end 120b of the waveguide to stop back-reflections from light reaching the end of the waveguide. However, the application of the low reflective coating requires an additional processing step in the manufacture of the spectrometer.

The invention aims to improve on the prior art.

SUMMARY OF THE INVENTION

According to the invention, there is provided a structure for guiding electromagnetic radiation, comprising: a substrate; a waveguide provided on the substrate and having a first end for receiving electromagnetic radiation and a second end; and an anti-reflection region provided at the second end of the waveguide on the substrate, the length and the width of the anti-reflection region being optimised to suppress back reflection of radiation that reaches the second end of the waveguide.

The back reflection in the waveguide is reduced as a result of the radiation becoming unguided as it enters the anti-reflection region where the diverging radiation field is absorbed by the material forming the anti-reflection region. By optimising the length and the width of the anti-reflection region, an effective reflectivity of almost 0% can be achieved.

The waveguide and the anti-reflection region may be formed from the same material. The waveguide and the anti-reflection region may be integrally formed as a single component. They may be provided on the substrate in the same processing step. The waveguide and the anti-reflection region may be provided as part of the same layer. If the waveguide comprises more than one layers, the waveguide and the anti-reflection region may provided as part of the same layers. The layers may include a quantum well.

The anti-reflection region may have a width substantially wider than a width of the waveguide. The anti-reflection region may further have a width substantially greater than a wavelength of the radiation in a material from which the anti-reflection region is formed. When the anti-reflection region is formed from the same material as the waveguide, the wavelength is also the wavelength of the radiation in the waveguide. For example, the anti-reflection region may have a width of at least 3 times the wavelength of the radiation in the material from which the waveguide and the anti-reflection region are formed. The structure may be a semiconductor based structure and the anti-reflection region may have a width of at least 3 times the wavelength of the radiation in the semiconductor waveguide. More specifically, the wavelength based on which the dimensions of the anti-reflection region is determined is not the free-space wavelength but the wavelength in the material from which the waveguide and the anti-reflection region is formed.

The anti-reflection region may have a length substantially longer than a wavelength of said electromagnetic radiation in a material from which the anti-reflection region is formed. When the anti-reflection region is formed from the same material, the wavelength is also the wavelength of the radiation in the waveguide. The anti-reflection section may have a length of typically at least 5 times the length of the wavelength of the electromagnetic radiation. Of course, the longer the anti-reflection region, the greater the proportion of radiation that is not back-reflected. When the waveguide and the anti-reflection region are formed from a semiconductor material, the wavelength of the radiation in the waveguide would be the wavelength of the radiation in the semiconductor material.

According to the invention there is provided a photonic component comprising the structure as described above.

According to the invention, there is also provided a chip comprising the structure as described above.

According to the invention, there is also provided a spectrometer comprising the structure described above. The spectrometer may further comprise a plurality of resonators provided on the substrate and coupled to the waveguide.

The plurality of resonators may be disk resonators

BRIEF DESCRIPTION OF THE DRAWINGS

Embodiments of the invention will now be described, by way of example, with reference to FIGS. 2 to 6 of the accompanying drawings, in which:

FIG. 5 illustrates a propagating continuous wave pattern in the waveguide arrangement according to the invention;

FIG. 6a is a graph showing how the radiation intensity at a particular location in the waveguide varies with time; and FIG. 6b indicates the location in the waveguide where the intensity of radiation is monitored for the graph of FIG. 6a.

DETAILED DESCRIPTION

Figure 1:
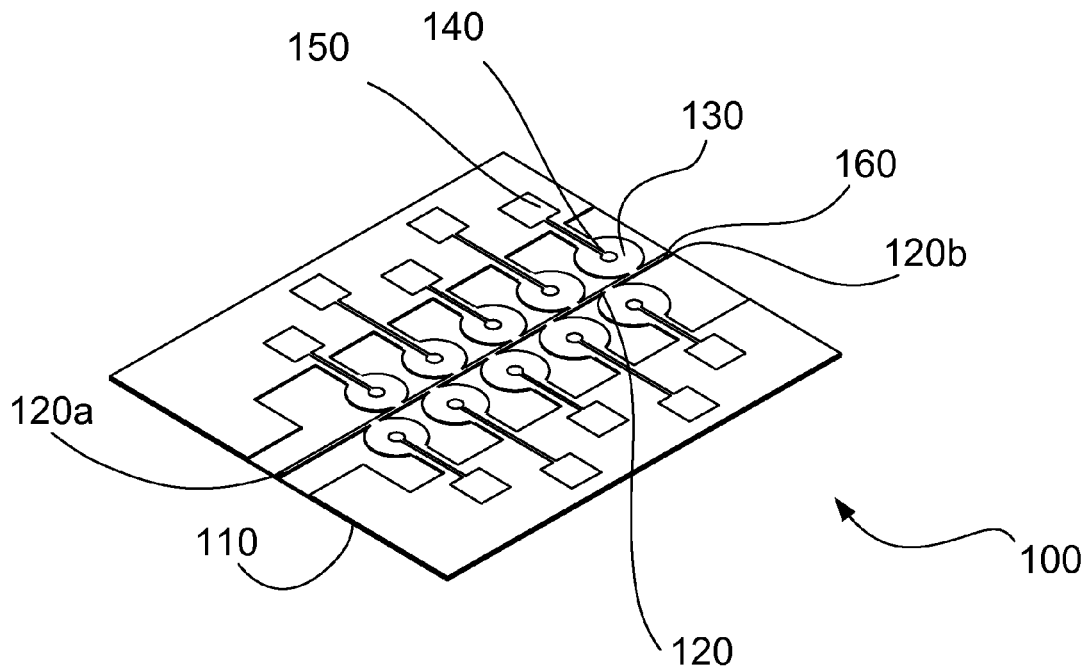
FIG. 1 is a perspective diagram of a prior art spectrometer.
Figure 2:
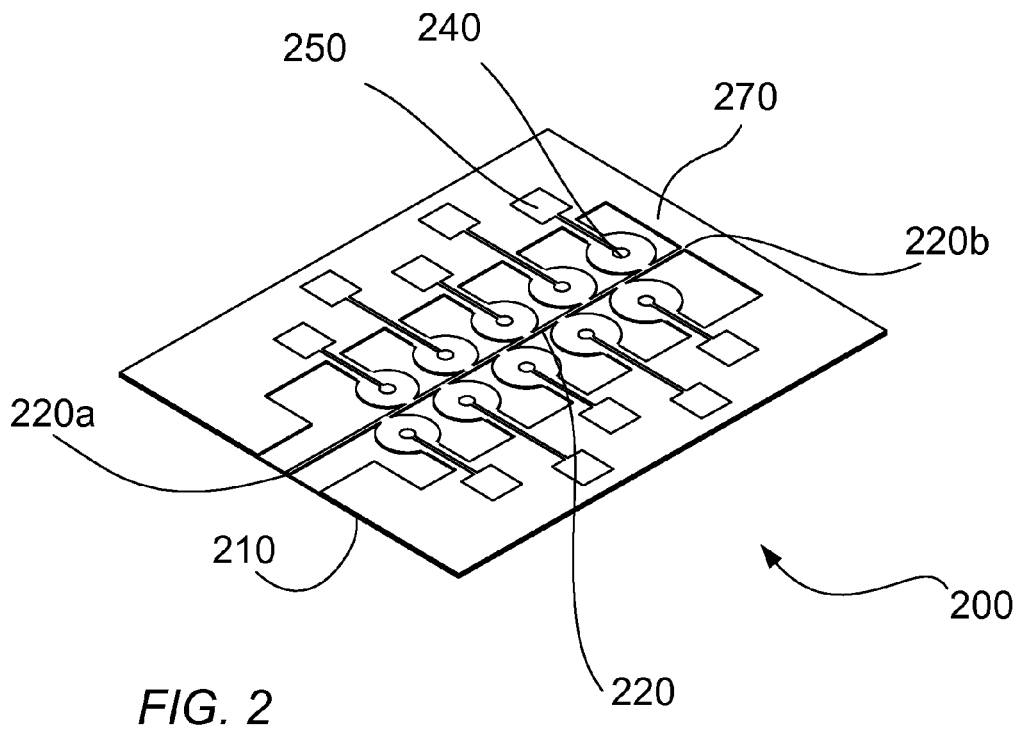
FIG. 2 is a perspective diagram of a spectrometer with a waveguide arrangement according to some embodiments of the invention.

With reference to FIG. 2, a perspective view of a spectrometer 200 with a waveguide arrangement according to some embodiments of the invention is shown. The spectrometer is a spectrometer-on-a-chip comprising a substrate 210, onto which are patterned an elongate waveguide 220 and a plurality of disk resonators 230 coupled to the waveguide. The waveguide can be arranged to receive and guide electromagnetic radiation of a predetermined range of wavelengths, including but not limited to optical, microwave or radio wavelengths, and may be a ridge waveguide. Light is received at a first end 220a of the waveguide and is guided towards a second end 220b, and each resonator 230 is arranged to support a resonant mode at a particular wavelength such that only light of that wavelength is coupled into the resonator 230. On top of each disk resonator 230 is an electrode 240 for detecting current that is proportional to the amount of light present in that resonator. The current detected in each resonator therefore indicates the amount of light at that wavelength that was present in the input beam of light. Each electrode 240 is further connected to a signal bond pad 250 for connecting the spectrometer 200 to an external device for measuring the current. It should be realised that although the resonators are described as separate from the waveguide, the resonators may be considered part of the waveguide.

According to the invention, the spectrometer chip 200 also comprises an anti-reflection region 270 coupled to the second end 220b of the waveguide 220. The anti-reflection region provides an abrupt and wide interface at the end of the waveguide so that waves propagating at the interface between the second end 220b of the waveguide and the anti-reflection region 270 become unguided and spreads into the anti-reflection region where it diverges and becomes absorbed by the anti-reflection region. The anti-reflection region may be formed on the substrate in the same processing step as the waveguide and resonators. It may be provided in the same material or materials as the waveguide and the waveguide and the anti-reflection region may be integrally formed as a single component. The waveguide and the anti-reflection region can be formed from, for example, semiconductor material. The waveguide and the anti-reflection region can alternatively be formed from different materials. However, that would of course require an additional processing step. Hereinafter, the waveguide and the anti-reflection region will be described as formed from the same material in the same processing step. The anti-reflection region 270 may be provided as an additional feature in the mask layout of the spectrometer chip. The length and the width of the anti-reflection region are optimised to ensure that negligible back reflection of light occurs. Since the back reflection is effectively eliminated, or at least reduced using the anti-reflection region, a low reflective coating at the end of the waveguide is not required and the costly extra step of evaporating or sputtering the coating onto the waveguide can be avoided.

Figure 3:
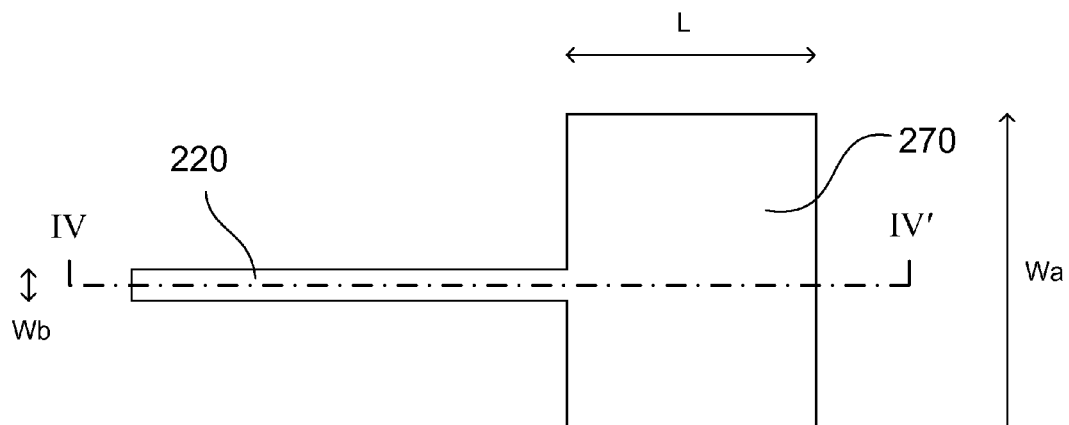
FIG. 3 is a plan view of the waveguide arrangement according to the invention.
Figure 4:
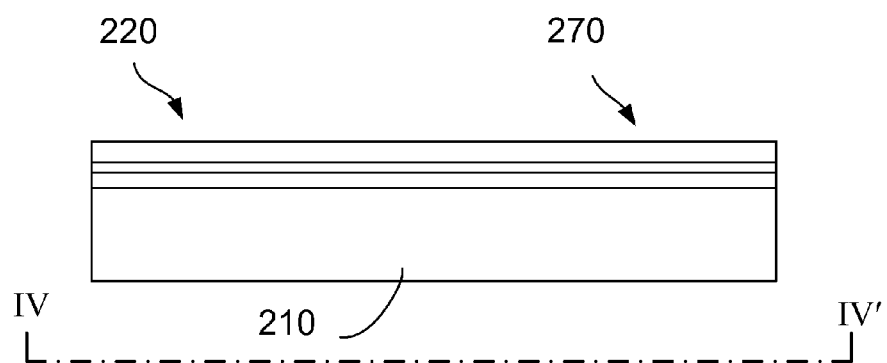
FIG. 4 shows a cross-section of the waveguide arrangement of FIG. 3.

It will be appreciated that although the anti-reflection region 270 has been described with respect to a spectrometer 200 above, it can be used to provide a mechanism for reducing or eliminating back reflection in any photonic component. A general waveguide arrangement structure is shown with respect to FIGS. 3 and 4. With reference to FIG. 3, a light guiding section, provided by the waveguide 220, is directly connected to a radiation absorption section provided by the anti-reflection region 270. Both sections may be patterned on top of a substrate 210, as shown in FIG. 4. The waveguide 220 and the anti-reflection region may be provided as one or a number of layers provided on top of the substrate as will be described in more detail below. The materials and the depths of the one or more layers are selected to guide the radiation in the waveguide without high losses but also such that the radiation is absorbed and scattered when the radiation becomes unguided and diverges in the anti-reflection region.

As discussed above, the width and the length of the anti-reflection region 270 is optimised to minimise back reflection of light reaching the end 220b of the waveguide. It is contemplated that the anti-reflection region 270 may not necessarily form a rectangle but an irregular geometrical shape. The length is then considered the distance in the direction of propagation of the wave and the width is considered the distance in the direction perpendicular to the direction of propagation of the wave in the waveguide 220.

As shown in FIG. 3, the width Wa of the anti-reflection region 270 is selected to be substantially wider than the width Wb of the waveguide 220. The waveguide can, for example, have a width of between 0.5 µm to 5 µm. The waveguide may be designed to support a single mode of resonance. Typically, the width of the waveguide Wb is of the order of the wavelength of the radiation in a material from which the waveguide is formed. It may be substantially equal to, or slightly larger than, the width of the wavelength of the radiation in the material from which the waveguide is formed.

More importantly, the width Wa of the anti-reflection region 270 is substantially wider than the wavelength of the light or other radiation in the material from which the waveguide and the anti-reflection region are formed. The waveguide and anti-reflection region may be formed from a semiconductor material and the width Wa may be significantly wider than the wavelength $\lambda$ of the radiation in the semiconductor material. The width of the anti-reflection region should be sufficiently large to ensure that the radiation present in the anti-reflection region is no longer guided. The width Wa of the waveguide may be equal to or wider than three times the wavelength $\lambda$ of the radiation in the material from which the waveguide and the anti-reflection region is formed to suppress back reflections into the waveguide. The input beam may include a plurality of wavelengths, for example when the device is a spectrometer as shown in FIG. 2. In such cases, the wavelength $\lambda$ based on which the dimensions of the anti-reflection region are determined may, for example, be the mean wavelength, in the material of the anti-reflection region, of the wavelength range of interest in the input beam.

Moreover, the length of the anti-reflection region is longer than the wavelength $\lambda$ of the radiation in the waveguide and the anti-reflection region. To eliminate effectively all the back reflection, the length of the anti-reflection region should be at least five times larger than the wavelength $\lambda$ of the radiation in the semiconductor from which the anti-reflection region is formed.

The waveguide and the anti-reflection region may be formed from a material having a refractive index substantially higher than air. If, for example, the waveguide comprises a semiconductor material having a refractive index of approximately 3 and the waveguide is arranged to receive radiation of wavelength 1500 nm in air, the wavelength in the light guiding section would be approximately 500 nm. It has then been found that a minimum length of the anti-reflection region, for significantly reducing back reflection, would be 2.5 μm. It is contemplated that a length of approximately 3 μm would provide a suitable length for eliminating back reflection Moreover, the minimum width would be 1.5 μm. As mentioned before, it is contemplated that as long as the distance of the anti-reflection region in the direction of propagation of light is equal to or longer than 5 times the wavelength λ of the radiation in the material from which the anti-reflection region is formed and the width is equal to or wider than 3 times the wavelength λ of radiation in the material from which the anti-reflection region is formed, the amount of reflected radiation is significantly reduced.

FIG. 4 shows a cross-section along the line Iv-Iv' of FIG. 3. As shown, a number of layers are deposited on top of the substrate 210. FIG. 4 only shows a small number of layers and it will be appreciated that the structure can include additional layers. The waveguide may be deposited onto the substrate as one or more layers. The waveguide 220 and the anti-reflection region 270 may extend in the same plane as the waveguide and be integrally formed with the waveguide. The substrate may be manufactured from any suitable type of semiconductor. For example, the substrate may be formed from n-doped Indium Phosphide (InP) with a dopant concentration of about $1\text{-}3 \times 10^{18}$ cm$^{-3}$. On top of the substrate there may be provided an etch-stop layer (not shown), which prevents etching of the substrate, and on top of the etch-stop layer there may be provided a support layer (not shown). As an example, an etch-stop layer may be formed from n-doped InGaAsP with a dopant concentration of $0.18\text{-}1.2 \times 10^{18}$ cm$^{-3}$ and the support layer may be formed from n-doped InP with a dopant concentration of $4\text{-}6 \times 10^{17}$ cm$^{-3}$. The waveguide 220 and the anti-reflection region 270 are then provided as one or more layers on top of the support layer. The layers may be formed from undoped InGaAsP. On top of the one or more layers forming the waveguide there may be formed a capping layer (not shown). The capping layer may be formed from p-doped InP with a dopant concentration of about $2 \times 10^{18}$ cm$^{-3}$. There may also be provided an isolation layer for metallisation on top of the capping layer.

The one or more layers that provide the waveguide 220 and the anti-reflection region 270 may have a higher refractive index than the support layer and the capping layer and the waveguide is formed from the refractive index contrast between the layers forming the waveguide and the support layer and capping layers. It will be appreciated that the layer structure described above is just an example and one or more layers may be removed or replaced. For example, if the structure does not comprise a support layer, the waveguide and anti-reflection region is provided between the refractive index contrast between the waveguide layers and the capping layer and the substrate. The one or more layers forming the waveguide and the anti-reflection region may comprise a layer with a band gap designed to absorb the radiation. It may be designed to have a low absorption coefficient to limit the absorption in the waveguide. When the light enters the anti-reflection region it becomes unguided. This means that the light travels over a greater distance through the absorbing layer and more of it is absorbed. Some of the light scatters, some of it back reflects from the semiconductor/air interface but then scatters further and undergoes more absorption on the way back. In other words, the key concept is that the light travels a greater distance through lossy material in the anti-reflection region and is strongly absorbed.

The one or more layers may form an active layer stack comprising two cladding layers between which an active absorbing layer is sandwiched. The absorbing layer may be a quantum well with a band gap designed to absorb the radiation in the anti-reflection region. The quantum well may be grown by molecular beam epitaxy or chemical vapour deposition which can control the layer thickness down to monolayers. The quantum well would be sufficiently thin to have little or no influence on the optical field in the waveguide. For example, the quantum well may have a thickness of approximately 3 nm. The radiation that enters the anti-reflection region 270 is absorbed in the quantum well provided in the anti-reflection region. The waveguide 220 ensures that the optical field is at a maximum over the quantum well which helps to increase absorptions.

If the waveguide arrangement of FIGS. 3 and 4 is provided in the spectrometer of FIG. 2, the resonators 230 would also include some or all of the layers described for the waveguide 220 and the anti-reflection region 270. The capping layer, the support layer and the cladding layers may have band gaps that are greater than the highest-energy photon of interest. In contrast, as mentioned above, an active layer sandwiched between the cladding layers may have a band gap that is less than the lowest-energy photon of interest, i.e. lower than the energy of a photon of the longest wavelength that the spectrometer is configured to detect. In this way, the composition of the active absorbing layer can be used in all disk resonators in the spectrometer. As mentioned above, when the absorbing layer is a quantum well, it is sufficiently thin to have little or no influence on the optical field in the waveguide. When light of a particular wavelength enters the resonator from the waveguide, it travels multiple cycles around the resonator and the photons can be absorbed by the material in the quantum well as the band gap is sufficiently low for even the lowest-energy photons to excite electrons from the valence band into the conduction band, generating electron-hole pairs. The resulting current can be measured, and is proportion to the amount of light energy in the disk resonator.

However, it will be appreciated that the structure does not have to be uniform across the resonators 230, the waveguide 220 and the anti-reflection region 270. For example, in some embodiments the absorbing layer is not provided in the waveguide 220. To achieve this, the absorbing layer in the waveguide can be selectively etched and replaced by a wider band-gap alloy or the absorbing layer can only be deposited in the disk resonators and/or the anti-reflection region in the first place.

It should of course be realised that the present invention is not limited to the layer structure shown in FIG. 3 and described above, and in other embodiments other structures may be used.

FIG. 5 shows the results of a simulation illustrating the effect of a 2.5 μm long and 3 μm wide anti-reflection region on radiation with a wavelength of approximately 500 nm in the semiconductor material from which waveguide and anti-reflection region are formed. The x-axis indicates the distance in a direction perpendicular to the direction of propagation of the wave in the waveguide and the y-axis indicates the distance in the direction of propagation of waves in the waveguide. It is clear from FIG. 5 that the radiation diverges as it enters the anti-reflection region. It is further clear from FIG. 5 that the light diverges over an area substantially wider than the width of the waveguide. The region at the end of the waveguide provides an end-stop for the radiation and the back-reflection into the waveguide is minimised.

FIG. 6a shows the results of another simulation of a waveguide arrangement comprising an anti-reflection region as shown in FIG. 6b. Light is detected by a detector in a location near the end of the waveguide coupled to an anti-reflection region substantially wider than the waveguide, as shown in FIG. 6b. The location where the light is detected is indicated with an arrow. The graph of FIG. 6a shows the intensity of detected light against time. It is clear from FIG. 6a that a pulse of light is detected as the light received in the waveguide is guided through the waveguide towards the anti-reflection region and that virtually 0% of the light that reaches the end of the waveguide is reflected back into the waveguide.

Whilst specific examples of the invention have been described, the scope of the invention is defined by the appended claims and not limited to the examples. The invention could therefore be implemented in other ways, as would be appreciated by those skilled in the art.

For example, it will be appreciated that the spectrometer, with respect to which embodiments of the invention have been described, may be considered to be, or form part of, a spectrophotometer. Therefore, where the term "spectrometer" has been used, the term could have been replaced with the term "spectrophotometer".

Moreover, although the spectrometer has been described in places to receive and guide light, the spectrometer can be used to guide and detect electromagnetic radiation of any wavelength. Additionally, although the spectrometer has been described to comprise disk resonators, the described waveguide may be used to guide light into any type of resonators. For example, the resonators may be any high Q cavities, such as spherical resonators, microrings etc.

It should be realised that although the invention has been described with respect to a spectrometer on a chip, the invention can be implemented in any device that uses a waveguide for guiding photons and in which back reflections are undesirable. For example, the invention could be used in an interferometer, optical switches, lasers, gratings etc. The invention could be used in any photonic component that utilises a waveguide. A photonic component is any component that generates, emits, transmits, modulates, processes, switches, amplifies detects and senses light. The photonic component can, for example, be used in a photonic integrated circuit, an optical sensor or in an optical communication device, including but not limited to an Add-Drop Multiplexer for an optical communication device.

The invention claimed is:

1. A structure for guiding electromagnetic radiation of a select wavelength, comprising: a substrate; a waveguide provided on the substrate and having a first end for receiving electromagnetic radiation of a select wavelength and a second end; and an anti-reflection region provided at the second end of the waveguide on the substrate, a length and a width of the anti-reflection region being selected to suppress back reflection of the electromagnetic radiation at the second end during operation, wherein the width of the anti-reflection region is substantially larger than the wavelength of the electromagnetic radiation in the anti-reflection region, and the length of the anti-reflection region is substantially longer than the wavelength of the electromagnetic radiation in the anti-reflection region, such that the anti-reflection region is configured to absorb the electromagnetic radiation and cause the electromagnetic radiation to diverge.

2. A structure according to claim 1, wherein the anti-reflection region has a width (Wa) substantially wider than a width (Wb) of the waveguide.

3. A structure according to claim 1, wherein the anti-reflection region has a width at least 3 times wider than the wavelength of the electromagnetic radiation which will reach the anti-reflection region.

4. A structure according to claim 1, wherein the anti-reflection region has a length at least 5 times the wavelength of the electromagnetic radiation which will reach the anti-reflection region.

5. A structure according to claim 1, wherein the waveguide and the anti-reflection region are formed from a same material.

6. A structure according to claim 1, comprising:
one or more layers forming the waveguide and the anti-reflection region.

7. A structure according to claim 6, wherein the one or more layers comprise:
a quantum well.

8. A structure according to claim 1, wherein the structure comprises:
semiconductor material.

9. A structure according to claim 1, wherein the structure is included in a photonic component.

10. A structure according to claim 1, wherein the structure is included in a chip.

11. A structure according to claim 1, wherein the structure is included in a spectrometer.

12. A structure according to claim 11, comprising:
a plurality of resonators provided on the substrate and being coupled to the waveguide, each of the resonators being resonant at a predetermined wavelength of the electromagnetic radiation.

13. A structure according to claim 12, wherein the plurality of resonators are disk resonators.

14. A structure according to claim 3, wherein the waveguide and the anti-reflection region are formed from a same material.

15. A structure according to claim 14, comprising:
one or more layers forming the waveguide and the anti-reflection region.

16. A structure according to claim 15, wherein the one or more layers comprise:
a quantum well.

17. A structure according to claim 4, wherein the waveguide and the anti-reflection region are formed from a same material.

18. A structure according to claim 17, comprising:
one or more layers forming the waveguide and the anti-reflection region.

19. A structure according to claim 1, wherein the waveguide is configured to receive electromagnetic radiation in a predetermined range of wavelengths, and the select wavelength is a mean wavelength of the predetermined range.

20. A structure according to claim 1, wherein the electromagnetic radiation diverges beyond a width of the waveguide.

* * * * *